(12) United States Patent
Jung et al.

(10) Patent No.: US 11,301,096 B2
(45) Date of Patent: Apr. 12, 2022

(54) TOUCH SENSOR AND METHOD OF MANUFACTURING THE SAME

(71) Applicant: DONGWOO FINE-CHEM CO., LTD., Iksan-si (KR)

(72) Inventors: Wonkyu Jung, Pyeongtaek-si (KR); Chan-Hee Lee, Pyeongtaek-si (KR); Taek Ki Lee, Hwaseong-si (KR)

(73) Assignee: DONGWOO FINE-CHEM CO., LTD., Iksan-si (KR)

(*) Notice: Subject to any disclaimer, the term of this patent is extended or adjusted under 35 U.S.C. 154(b) by 0 days.

(21) Appl. No.: 17/189,445

(22) Filed: Mar. 2, 2021

(65) Prior Publication Data
US 2021/0286465 A1   Sep. 16, 2021

(30) Foreign Application Priority Data

Mar. 10, 2020   (KR) .................. 10-2020-0029411

(51) Int. Cl.
*G06F 3/044*   (2006.01)

(52) U.S. Cl.
CPC .. *G06F 3/0443* (2019.05); *G06F 2203/04103* (2013.01)

(58) Field of Classification Search
None
See application file for complete search history.

(56) References Cited

U.S. PATENT DOCUMENTS

2006/0132450 A1*  6/2006  Yamada .................. G06F 3/041
                                                      345/173

FOREIGN PATENT DOCUMENTS

KR   10-2013-0075369 A   7/2013
KR   10-2015-0031061 A   3/2015

* cited by examiner

*Primary Examiner* — Duane N Taylor, Jr.
(74) *Attorney, Agent, or Firm* — Sughrue Mion, PLLC

(57) ABSTRACT

A touch sensor includes a base layer and an electrode pad portion formed in a bezel area of the base layer. The base layer includes recessed portions, which are spaced apart along the edge and recessed inward, outside the electrode pad portion.

14 Claims, 8 Drawing Sheets

【Figure 1】
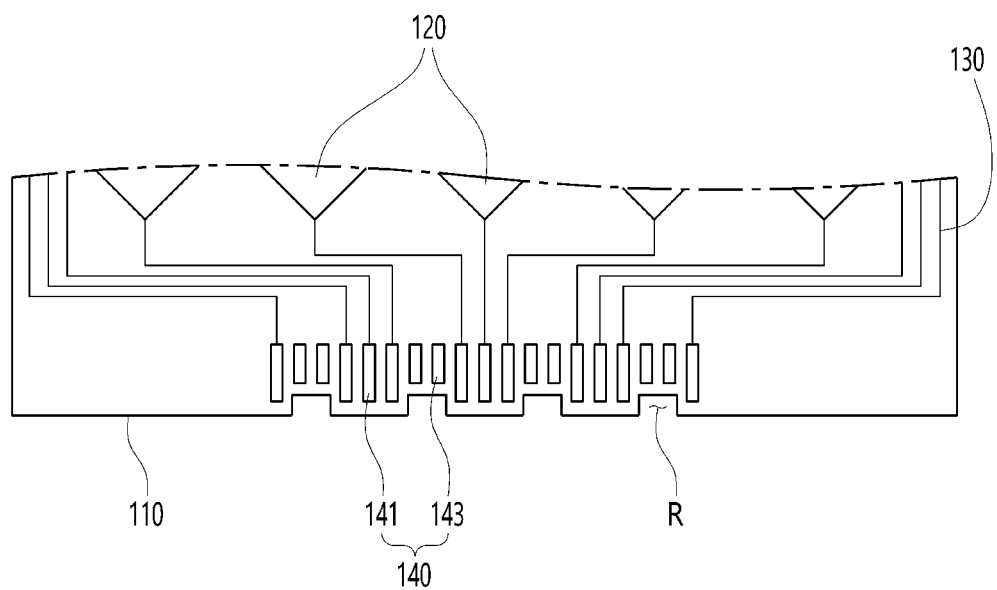

[Figure 2]
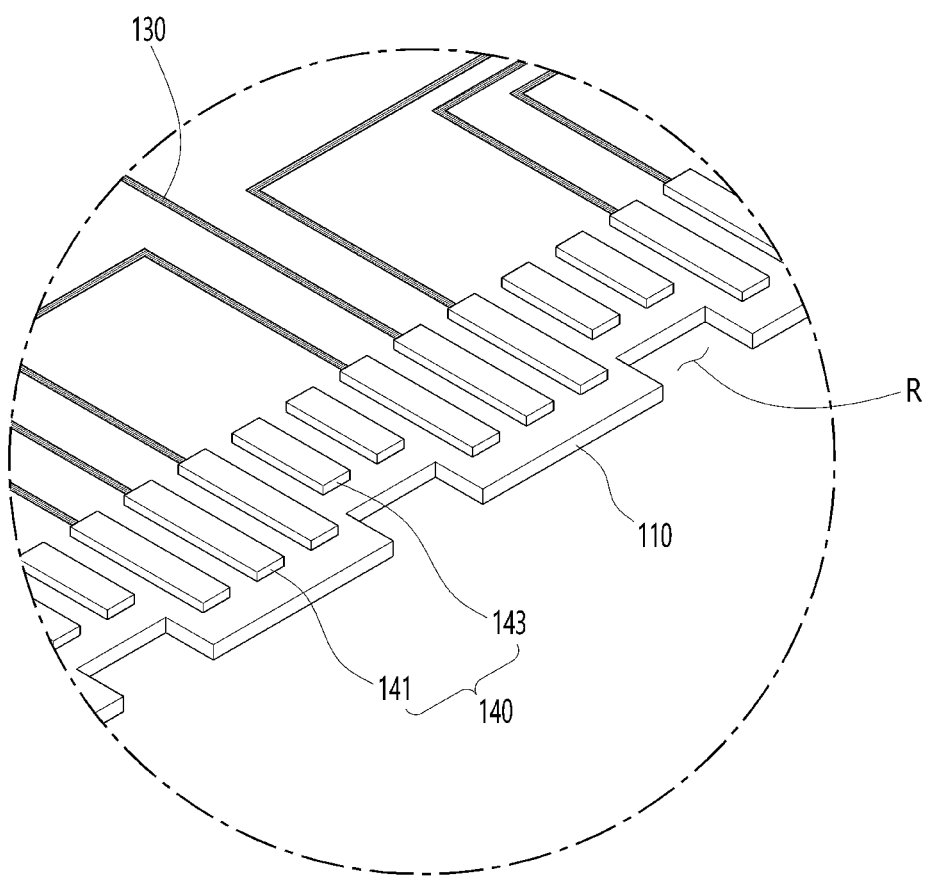

【Figure 3A】
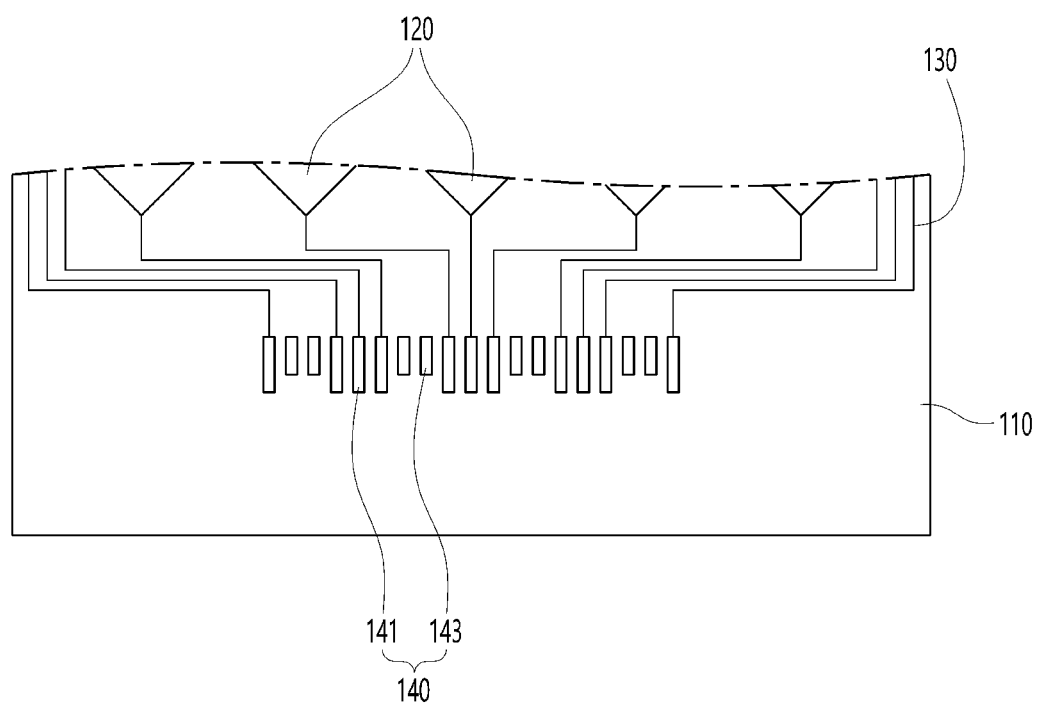

【Figure 3B】
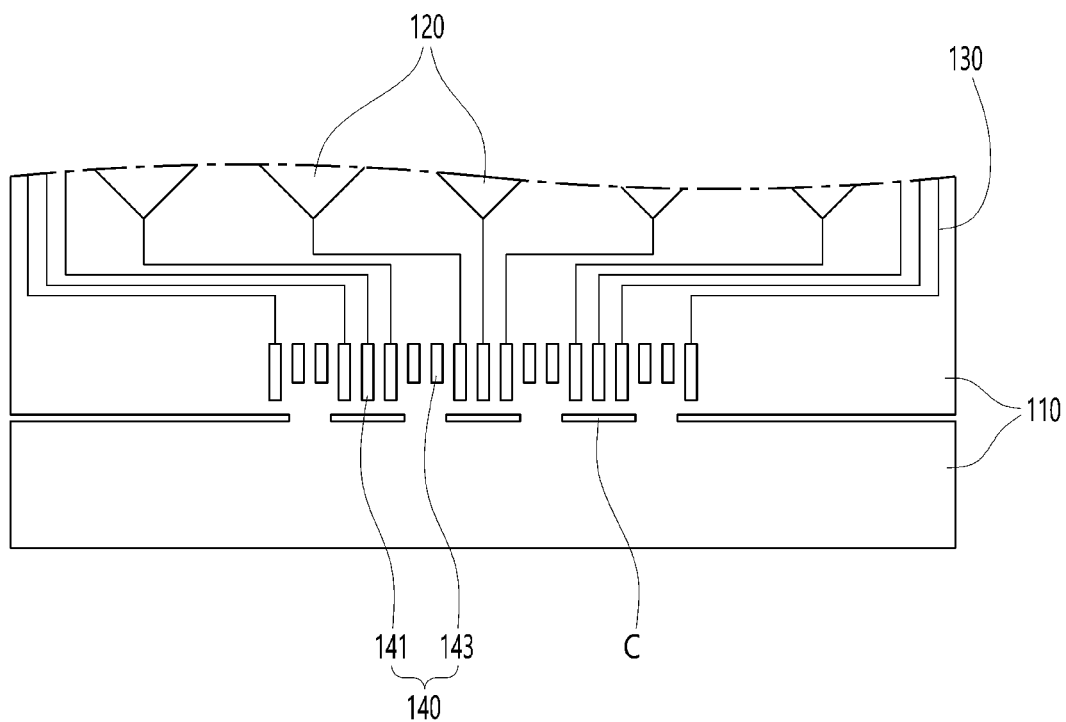

[Figure 3C]
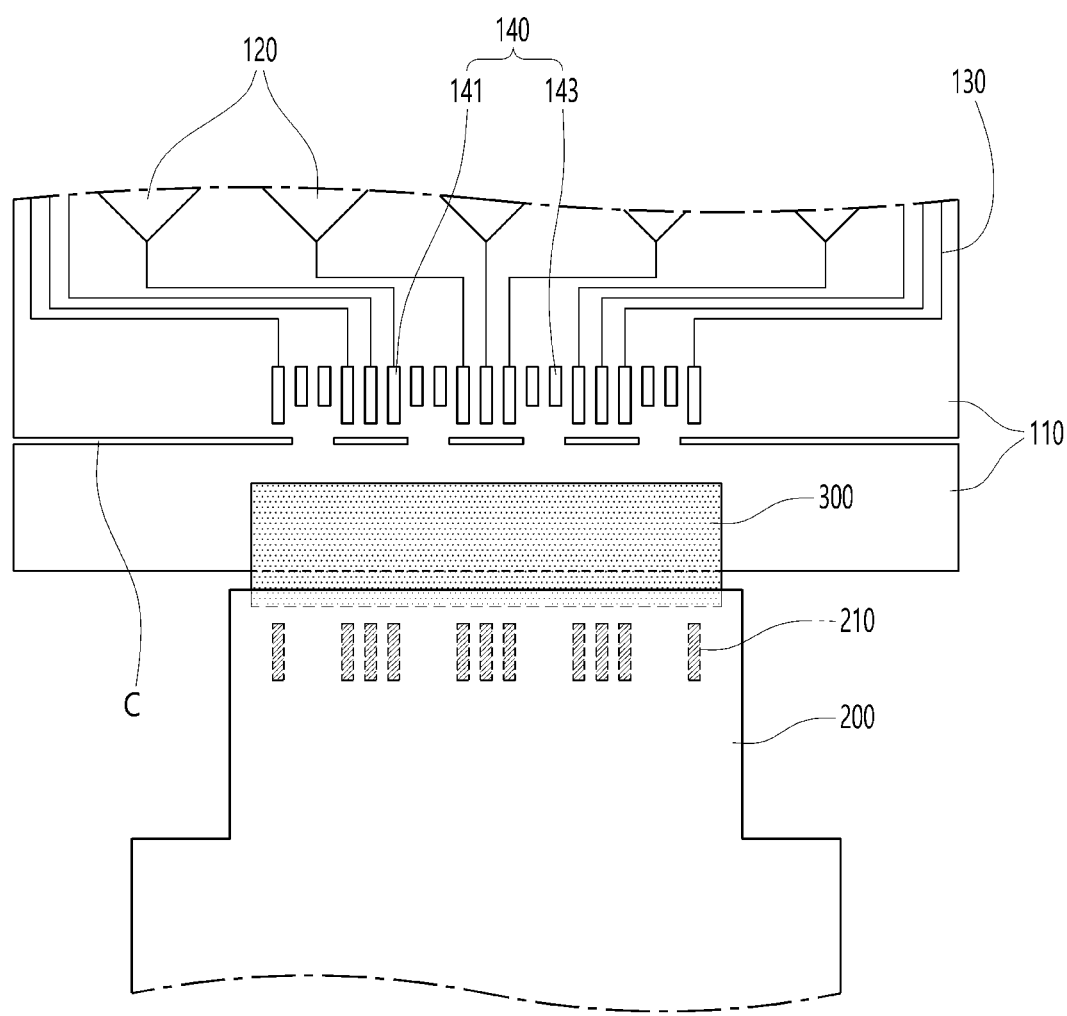

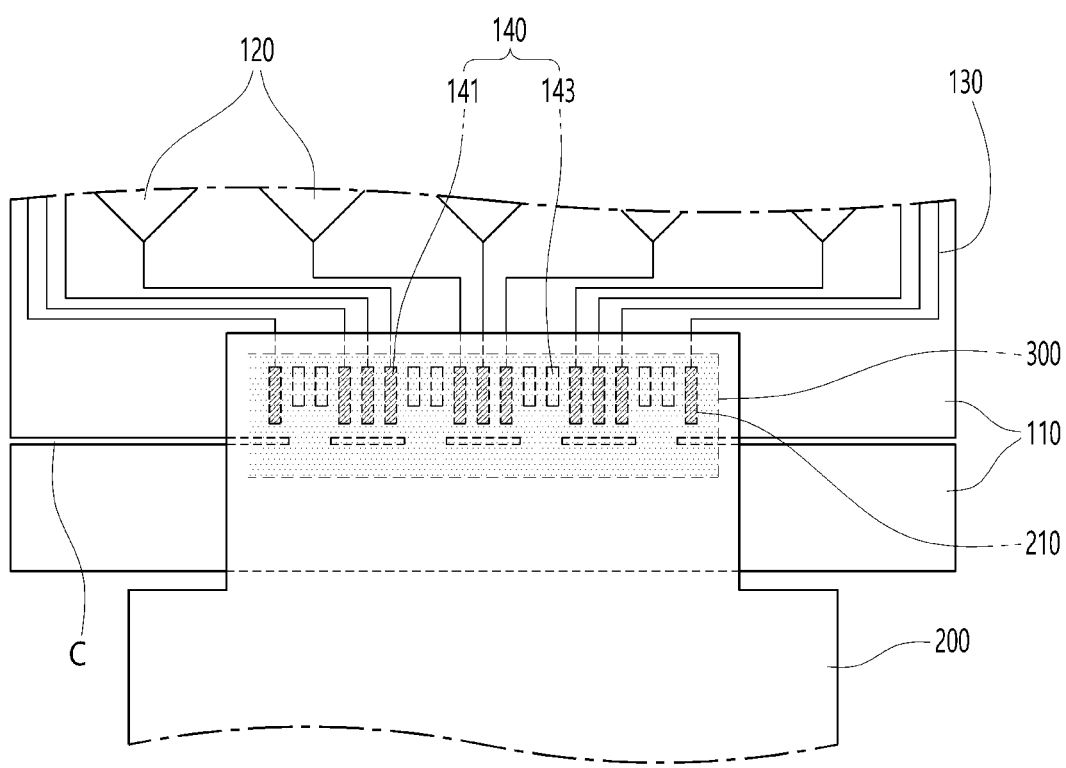
[Figure 3D]

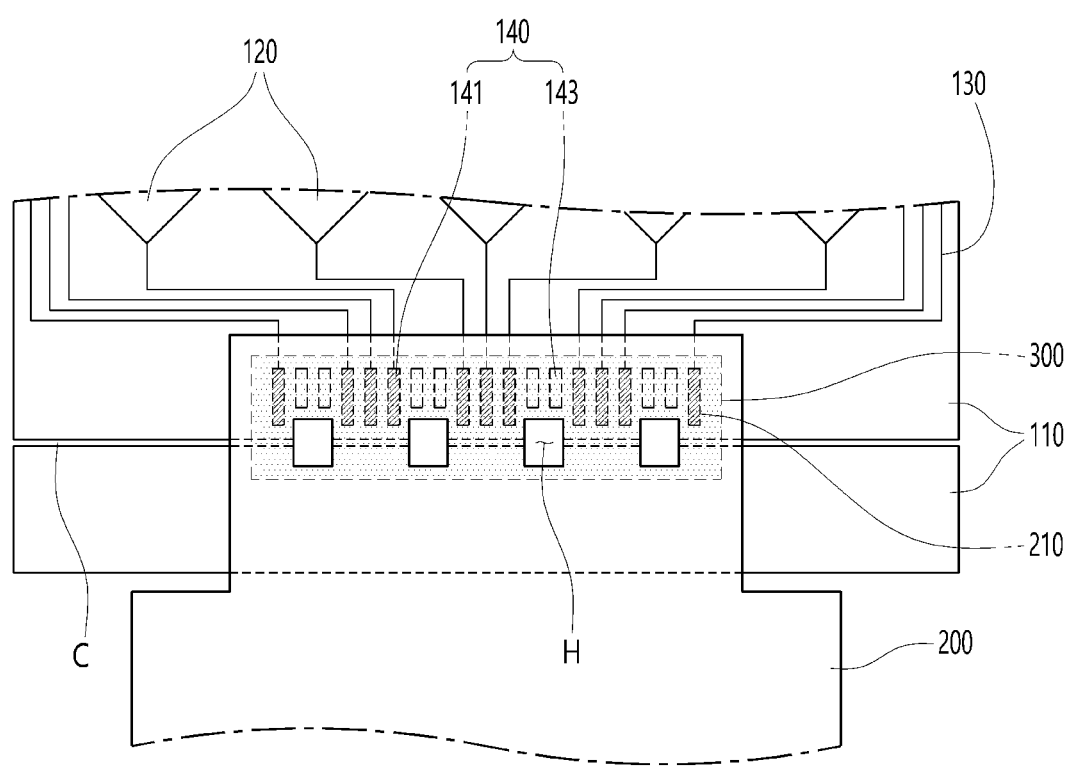
[Figure 3E]

[Figure 3F]
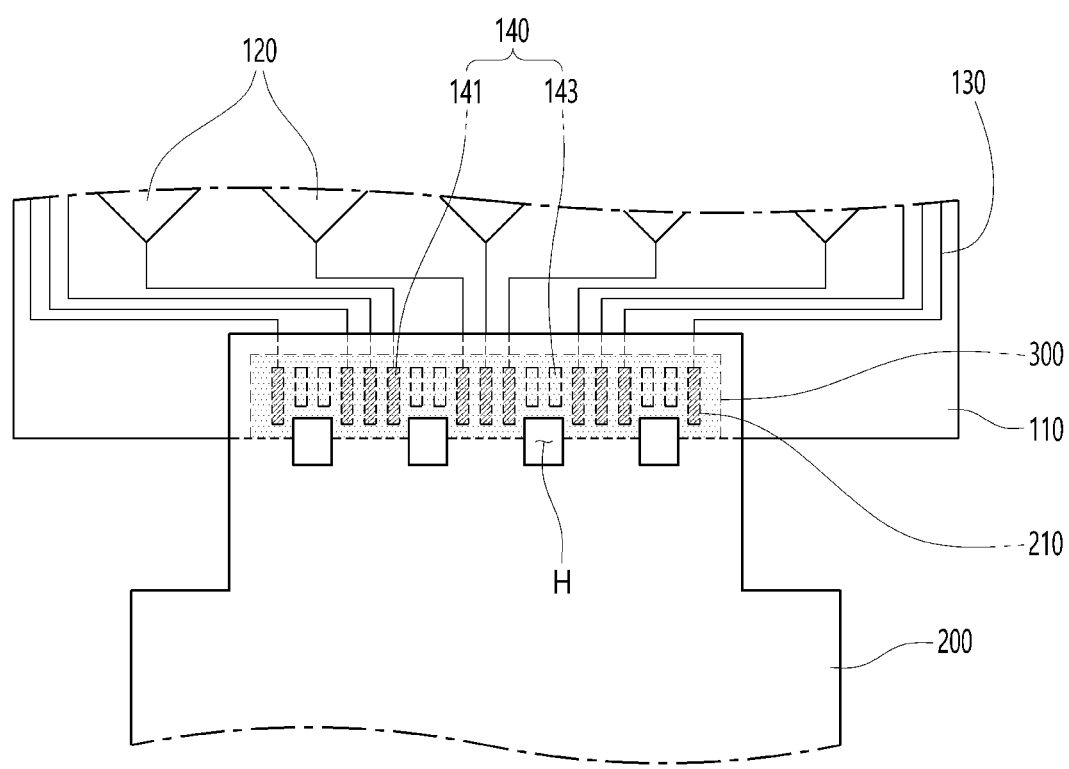

TOUCH SENSOR AND METHOD OF MANUFACTURING THE SAME

CROSS REFERENCE TO RELATED APPLICATIONS

This application claims priority based on Korean Patent Application No. 10-2020-0029411, filed Mar. 10, 2020, the content of which is incorporated herein by reference in its entirety.

TECHNICAL FIELD

The present invention relates to a touch sensor. Specifically, the present invention relates to a touch sensor and a method of manufacturing the same, which facilitates bonding of a bonding pad portion of a printed circuit board and an electrode pad portion of a touch sensor, and has good electrical connection, even if the bezel area is narrow.

BACKGROUND ART

A touch sensor of a smartphone or the like is a device that senses a touch signal. The touch sensor may be classified into a resistive type, a capacitive type, an ultrasonic type, an infrared type, and so on, according to the sensing method of a touch part. Recently, the capacitive type is mainly used for the touch sensor.

The capacitive type uses a transparent substrate on which a conductive thin film is formed. In the capacitive type, when a user touches a surface of a coated transparent substrate with a certain amount of current flowing through the surface of the transparent substrate, the amount of current changes at the contact surface. The capacitive type detects such a change in current to detect whether or not it is touched.

A touch sensor includes a plurality of sensing cells. The sensing cells may be classified into the first sensing cells connected in the X axis direction and the second sensing cells connected in the Y axis direction. The first and second sensing cells may be respectively connected to the first and second wiring portions. The first and second wiring portions may extend along the side edges of the transparent substrate to be connected to an electrode pad portion formed at the lower edge of the transparent substrate, that is, a bezel area. The electrode pad portion may be connected to a printed circuit board such as FPC, COF, TCP, or the like through an anisotropic conductive film (ACF) or the like.

Recently, in smartphone manufacturing, the display area is widening by reducing the bezel area. When the bezel area is reduced, the size (length, etc.) of the electrode pad is also reduced, so that a bonding process between the bonding pad and the electrode pad may become difficult. In addition, when the bezel area is reduced, the width of the ACF is also reduced, so that the connection failure rate between the bonding pad and the electrode pad increases, and as a result, the product defect rate may increase. These series of results can limit the reduction in the width of the ACF and further make it difficult to narrow the bezel area.

DISCLOSURE OF INVENTION

Technical Problem

An object of the present invention is to provide a touch sensor capable of easily performing a bonding process between a bonding pad and an electrode pad in manufacturing a touch sensor having a narrow bezel area, and a method of manufacturing the same.

In addition, the present invention is to provide a touch sensor capable of preventing or minimizing connection failure between a bonding pad and an electrode pad, and a method of manufacturing the same.

Technical Solution

A touch sensor of the present invention for achieving these objects includes a base layer and an electrode pad portion formed in a bezel area of the base layer. The base layer may have recessed portions, which are spaced apart along an edge and recessed inward, on an outer side of the electrode pad portion.

In the touch sensor of the present invention, the electrode pad portion may include a dummy pad and the recessed portion may be formed outside of the dummy pad.

In the touch sensor of the present invention, the recessed portion may have an oval shape.

In the touch sensor of the present invention, the recessed portion may have a rectangular shape.

The touch sensor of the present invention may further comprise a printed circuit board. The printed circuit board may have a bonding pad portion to be bonded to the electrode pad portion via a conductive film and a through hole in a corresponding area of the recessed portion.

A laminate according to the present invention may comprise the touch sensor described above and a window laminated on the touch sensor.

The laminate according to the present invention may further comprise a polarizing layer laminated on one surface of the touch sensor or the window.

The laminate according to the present invention may further comprise a decorative film laminated on one surface of the touch sensor or the window.

A method of manufacturing a touch sensor according to the present invention may comprise steps of: forming an electrode pad portion having an electrode pad and a dummy pad in a bezel area of a base layer; forming a separation cut portion to be cut in a width direction of the electrode pad in the base layer outside the electrode pad; bonding a printed circuit board having a bonding pad portion to the electrode pad portion via a conductive film; forming a punch hole in the printed circuit board, the conductive film, and the base layer in the area between the separation cut portions including end portions of the separation cut portion in a length direction; and forming a recessed portion along an edge of the base layer in the area of the dummy pad by removing the base layer outside the separation cut portion separated by the separation cut portion and the punch hole.

In the method of manufacturing a touch sensor according to the present invention, the separation cut portion may be formed in a linear shape.

In the method of manufacturing a touch sensor according to the present invention, the punch hole may be formed in an oval shape.

In the method of manufacturing a touch sensor according to the present invention, the punch hole may be formed in a rectangular shape.

Advantageous Effects

According to the present invention having such a configuration, even if the bezel area is narrow, the bonding process can be performed in a state where the base layer of the electrode pad portion area is formed wide. Through this, the present invention can facilitate the bonding process of the bonding pad portion and the electrode pad portion.

In addition, according to the present invention, the base layer outside the electrode pad portion is removed after the bonding process is completed, and as a result, a narrow bezel area can be implemented.

DESCRIPTION OF DRAWINGS

FIG. 1 is a plan view of a touch sensor according to the present invention.

FIG. 2 is a partially enlarged perspective view of a touch sensor according to the present invention.

FIGS. 3A to 3F are process diagrams showing a process of manufacturing a touch sensor according to the present invention.

BEST MODE

Hereinafter, the present invention will be described in detail with reference to the accompanying drawings.

FIG. 1 is a plan view of a touch sensor according to the present invention. FIG. 2 is a partially enlarged perspective view of a touch sensor according to the present invention.

As shown in FIGS. 1 and 2, the touch sensor of the present invention may include a base layer 110, a sensing electrode portion 120, a wiring portion 130, an electrode pad portion 140, and so on.

The base layer 110 is a base of the sensing electrode portion 120, the wiring portion 130, and the electrode pad portion 140. The base layer 110 may be composed of a cyclo-olefin polymer (COP), polycarbonate, polyethylene terephthalate (PET), polymethyl (meth)acrylate, polyimide, polyethylene naphthalate, polyether sulfone, etc.

The base layer 110 may be a separation layer, a protective layer, or a laminate of a separation layer and a protective layer when the touch sensor is manufactured by a transfer method. The separation layer may be composed of an organic polymer, for example, polyimide, poly vinyl alcohol, polyamic acid, polyamide, polyethylene, polystyrene, polynorbornene, or the like. The protective layer may include at least one of an organic insulation layer or an inorganic insulation layer. The protective layer can be formed through coating/curing or deposition.

A plurality of recessed portions R spaced apart along the edge may be formed in the base layer 110. The recessed portion R may be recessed from the outside of the electrode pad portion 140 to the inside. The recessed portions R may have the same depth. The recessed portion R may be formed outside a dummy pad 143 of the electrode pad portion 140. The recessed portion R may have a rectangular recessed shape, but an oval shape may be more preferable in order to prevent or minimize the occurrence of cracks in the electrode pad 141 by reducing the stress at the edge.

The sensing electrode portion 120 may include a sensing electrode for sensing a touch. The sensing electrode portion 120 may be patterned on the base layer 110. The sensing electrode portion 120 may be formed to have a pattern structure used in a capacitive type. A mutual-capacitance type or a self-capacitance type may be employed as the capacitive type. In the case of the mutual-capacitance type, a grid pattern with a horizontal axis and a vertical axis may be included. A bridge electrode may be included at an intersection of the horizontal axis and the vertical axis. In the case of the self-capacitance type, it may have a pattern structure in which a change in capacitance is read by using one electrode at each point.

The sensing electrode portion 120 may be formed of a transparent conductive layer. The transparent conductive layer may be composed of, for example, a metal, a metal nanowire, a metal oxide, a carbon nanotube, graphene, a conductive polymer, a conductive ink, or the like. As the metal, gold (Au), silver (Ag), copper (Cu), molybdenum (Mo), aluminum (Al), palladium (Pd), Neodymium (Nd), silver-palladium-copper alloy (APC) or the like may be used. As the metal oxide, indium tin oxide (ITO), indium zinc oxide (IZO), indium zinc tin oxide (IZTO), aluminum zinc oxide (AZO), gallium zinc oxide (GZO), fluorine tin oxide (FTO), zinc oxide (ZnO), indium tin oxide-silver-indium tin oxide (ITO-Ag-ITO), indium zinc oxide-silver-indium zinc oxide (IZO-Ag-IZO), indium zinc tin oxide-silver-indium zinc tin oxide(IZTO-Ag-IZTO), aluminum zinc oxide-silver-aluminum zinc oxide (AZO-Ag-AZO), etc. may be used.

When the sensing electrode portion 120 is used for foldable devices, it may be preferable to be formed of a soft conductive material. As the soft conductive material, polyethylenedioxythiophene (PEDOT: poly 3,4-ethylenedioxythiophene), PEDOT:PSS (polystyrene sulfonate), or a mixture of PEDOT:PSS and metal nanowires may be used. PEDOT:PSS is a polythiophene-based conductive polymer, which is poly(3,4-ethylenedioxythiophene) doped with polystyrene sulfonate (PSS). PEDOT:PSS can be prepared by oxidative polymerization of 3,4-ethylenedioxythiophene (EDOT) in an aqueous solution using PSS as a template for balancing charge. PEDOT:PSS allows PEDOT to be ionic bonded very strongly to the PSS polymer chain. As a result, PEDOT:PSS is not separated from each other in an aqueous solution and can be stably dispersed as polymer gel particles.

Metal nanowires consist of a conductive metal in the form of nano-unit wires. Metal nanowires may be silver (Ag), gold (Au), copper (Cu), nickel (Ni), platinum (Pt), palladium (Pd), or aluminum (Al) nanowires, or may be core-shell wires with a combination thereof. The nanowires can be connected to each other to act as electrodes. Nanowires can be transparent due to their nano-sized dimension.

The wiring portion 130 may transmit a sensing signal from the sensing electrode portion 120 to the electrode pad portion 140. The wiring portion 130 may be formed of a conductive material, for example, a conductive metal such as nickel, cobalt, silver, copper, gold, or palladium, a conductive metal oxide, or a laminate thereof.

The electrode pad portion 140 may transmit a sensing signal received through the wiring portion 130 to the outside, that is, a printed circuit board. The electrode pad portion 140 may be formed on the base layer 110 in the bezel area.

The electrode pad portion 140 may include an electrode pad 141 connected to the wiring portion 130 to transmit a sensing signal, and a dummy pad 143 which is not connected to the wiring portion 130.

The electrode pad 141 may have a width of 10 μm to 40 μm and a length of 0.5 mm to 2.0 mm, for example. The electrode pad 141 may be made of a conductive metal such as nickel, cobalt, silver, copper, gold, and palladium. The electrode pad 141 may have a height of 0.2 um to 0.5 um. The spacing between the electrode pads 141, that is, the pitch, may be 10 μm to 40 μm similar to the width.

The dummy pad 143 may have the same size as the electrode pad 141. Or it may have the same height with the smaller width and length, or the same height and width with the smaller length.

The touch sensor according to the present invention may further include a passivation layer (not shown) and a functional layer (not shown).

The passivation layer (not shown) may insulate and protect the sensing electrode portion 120 and the wiring portion 130. The passivation layer may be formed on the sensing electrode portion 120, the wiring portion 130, and the base layer 110. The passivation layer may be formed to open the electrode pad portion 140. The passivation layer may be composed of one or more materials selected from a curable prepolymer, a curable polymer, and a plastic polymer, which are general insulators.

The passivation layer may be made of a varnish-type material capable of forming a film. The varnish-type material may be polysilicon, such as polydimethylsiloxane (PDMS) or polyorganosiloxane (POS), polyimide, or polyurethane, such as spandex. The varnish-type material is a soft insulation material and can increase the stretchability and dynamic folding capability of the touch sensor.

The functional layer (not shown) may be a transparent film, a polarizing layer, or the like. The transparent film may be an isotropic film, a retardation film, a protective film, or the like. As the polarizing layer, for example, those in which a protective layer is formed on at least one surface of a polarizer dyed with iodine or a dichroic dye after stretching a polyvinyl alcohol film, a liquid crystal aligned to have the performance of a polarizer, a transparent film coated with an oriented resin such as polyvinyl alcohol, and then stretched and dyed, or the like may be used.

The functional layer (not shown) may be formed on the passivation layer. The functional layer may be formed to open the electrode pad portion 140. The functional layer may open the electrode pad portion 140 in a shape such as a rectangle, a circle, or an oval.

A laminate according to the present invention may include the touch sensor described above and a window laminated on the touch sensor.

The laminate according to the present invention may include a polarizing layer laminated on one surface of the touch sensor or window.

The laminate according to the present invention may include a decorative film laminated on one surface of the polarizing layer or window.

FIGS. 3A to 3F are process diagrams showing a process of manufacturing a touch sensor according to the present invention.

In the manufacturing process of the touch sensor according to the present invention, first, as shown in FIG. 3A, a sensing electrode portion 120, a wiring portion 130, and an electrode pad portion 140 may be formed on a base layer 110.

The electrode pad portion 140 including an electrode pad 141 and a dummy pad 143 may be formed in a bezel area. At this time, the base layer 110 may be formed to have an extra width outward from the outer end of the electrode pad portion 140. Through this, when it is bonded to a bonding pad portion (210 of FIG. 3C) of a printed circuit board (200 of FIG. 3C) via a conductive film (300 of FIG. 3C), the bonding process can be smoothly performed.

As shown in FIG. 3B, a separation cut portion C, for example, a cut portion in the form of a cut may be formed in the base layer 110. The separation cut portion C may be formed outside the electrode pad 141 of the area of the electrode pad portion 140. The separation cut portion C may be formed by a length corresponding to the area of the electrode pads 141 between the dummy pads 143. The separation cut portion C may be formed to have a length including a part of the area of the dummy pads 143.

The separation cut portion C may be an outer end boundary line of the bezel area. The separation cut portion C may preferably have a linear shape in which the length direction is formed in the width direction of the electrode pad 141.

As shown in FIGS. 3C and 3D, the printed circuit board 200 having the bonding pad portion 210 may be bonded to the electrode pad portion 140 via the conductive film 300.

The printed circuit board 200 may include a bonding pad portion 210. The bonding pad portion 210 may be in electrical contact with the electrode pad portion 140 to receive a sensing signal from the electrode pad portion 140.

The bonding pad portion 210 may be made of the same material as the electrode pad portion 140, for example, a conductive metal such as nickel, cobalt, silver, copper, gold, palladium, a conductive metal oxide, or a laminate thereof.

The bonding pad portion 210 may include a plurality of bonding bumpers protruding downward and electrically connected to the electrode pads 141. The bonding bumper may be configured with the same width and length as the electrode pad 141, for example, a width of 10 μm to 40 μm, a length of 0.5 mm to 2.0 mm, and with a thickness of 5 μm to 15 μm, which is thicker than that of the electrode pad 141. The spacing between the bonding bumps, that is, the pitch, may be configured to be 10 μm to 40 μm, the same as the pitch of the electrode pads 141.

The bonding pad portion 210 may not have a dummy bumper corresponding to the dummy pad 143, as shown in FIG. 3C, but may be provided with a dummy bumper.

As the conductive film 300, an anisotropic conductive film (ACF) may be used. One side of the conductive film 300 is coupled to the electrode pad 141 and the other side is coupled to the bonding bumper of the printed circuit board 200 to electrically connect the electrode pad portion 140 and the printed circuit board 200.

The anisotropic conductive film is an adhesive film in the form of a double-sided tape and may include an adhesive curable by heat and fine conductive balls floating therein.

The fine conductive balls positioned on the electrode pad 141 and the bonding bumper may conduct electricity between the electrode pad 141 and the bonding bumper, when the anisotropic conductive film is pressed between the electrode pad 141 and the bonding bumper. As the fine conductive balls, metal particles, metal-coated resin particles, or the like may be used. As the metal particles, nickel, cobalt, silver, copper, gold, palladium, solder particles, etc. may be used alone or in combination of two or more. Metal-coated resin particles may be resins such as styrene-divinylbenzene copolymer, benzoguanamine resin, cross-linked polystyrene resin, acrylic resin, and styrene-silica composite resin with conductive metals such as nickel, silver, solder, copper, gold, palladium coated on the surface thereof. These can be used alone or in combination of two or more. The conductive ball may have a diameter of 3 μm to 15 μm, and may be included in an amount of 1 to 15% by weight of the total weight.

The adhesive may be cured while filling the space between the electrode pad 141 and the bonding bumper, thereby performing an adhesive function.

As shown in FIG. 3E, a punch hole H penetrating through the printed circuit board 200, the conductive film 300, and the base layer 110 may be formed. The punch hole H may be formed in an area between the separation cut portions C while including at least a part of the longitudinal ends of the separation cut portions C.

The punch hole H is connected to the separation cut portion C of the base layer 110 to separate the bezel area into an inner area including the electrode pad portion 140 and an outer area without the electrode pad portion 140.

The punch hole H may be formed in any shape as long as it connects the adjacent separation cut portions C, however, it may be desirable to form to have a circular or an oval shape in order to minimize the stress that the edge of the base layer 110 may apply to the electrode pad 141.

When the process of FIG. 3E is completed, the printed circuit board 200 is provided with a through hole in an area corresponding to the recessed portion R of the base layer 110 by the punch hole H.

Thereafter, as shown in FIG. 3F, the outer area of the base layer 110 separated by the separation cut portion C and the punch hole H, that is, the outer area located outside the separation cut portion C may be removed. When the process of FIG. 3F is completed, the recessed portion R may be formed along an edge of the base layer 110 in an outer area of the dummy pad 143. In this way, the recessed portion R may be formed by removing the base layer 110 inside the punch hole H.

The preferred embodiments of the present invention have been described with reference to the drawings. However, the present invention is not limited to the above-described embodiments, and it will be understood that the present invention can be implemented in a modified form without departing from the essential characteristics of the present invention.

Therefore, the scope of the present invention is defined by the claims rather than the foregoing description, and all differences within the equivalent range should be interpreted as being included in the present invention.

DESCRIPTION OF REFERENCE NUMERALS

110: base layer
120: sensing electrode portion
130: wiring portion
140: electrode pad portion
141: electrode pad
143: dummy pad
200: printed circuit board
210: bonding pad portion
C: separation cut portion
H: punch hole
R: recessed portion

The invention claimed is:

1. A touch sensor comprising:
a base layer; and
an electrode pad portion formed in a bezel area of the base layer,
wherein the base layer has recessed portions, which are spaced apart along an edge and recessed inward, on an outer side of the electrode pad portion.

2. The touch sensor according to claim 1, wherein the electrode pad portion includes a dummy pad and the recessed portion is formed outside of the dummy pad.

3. The touch sensor according to claim 2, wherein the recessed portion has an oval shape.

4. The touch sensor according to claim 2, wherein the recessed portion has a rectangular shape.

5. The touch sensor according to claim 1, further comprising a printed circuit board having a bonding pad portion to be bonded to the electrode pad portion via a conductive film and a through hole in a corresponding area of the recessed portion.

6. A laminate comprising:
the touch sensor according to claim 1; and
a window laminated on the touch sensor.

7. The laminate according to claim 6, further comprising a polarizing layer laminated on one surface of the touch sensor or the window.

8. The laminate structure according to claim 7, further comprising a decorative film laminated on one surface of the touch sensor or the window.

9. The touch sensor according to claim 2, further comprising a printed circuit board having a bonding pad portion to be bonded to the electrode pad portion via a conductive film and a through hole in a corresponding area of the recessed portion.

10. The touch sensor according to claim 3, further comprising a printed circuit board having a bonding pad portion to be bonded to the electrode pad portion via a conductive film and a through hole in a corresponding area of the recessed portion.

11. The touch sensor according to claim 4, further comprising a printed circuit board having a bonding pad portion to be bonded to the electrode pad portion via a conductive film and a through hole in a corresponding area of the recessed portion.

12. A laminate comprising:
the touch sensor according to claim 2; and
a window laminated on the touch sensor.

13. A laminate comprising:
the touch sensor according to claim 3; and
a window laminated on the touch sensor.

14. A laminate comprising:
the touch sensor according to claim 4; and
a window laminated on the touch sensor.

* * * * *